(12) United States Patent
Egner-Walter

(10) Patent No.: US 6,364,570 B1
(45) Date of Patent: *Apr. 2, 2002

(54) FASTENING DEVICE FOR A WINDSCREEN WIPER SYSTEM

(75) Inventor: Bruno Egner-Walter, Heilbronn (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/462,919

(22) PCT Filed: May 28, 1999

(86) PCT No.: PCT/EP99/03696

§ 371 Date: Jan. 14, 2000

§ 102(e) Date: Jan. 14, 2000

(87) PCT Pub. No.: WO00/06430

PCT Pub. Date: Feb. 10, 2000

(30) Foreign Application Priority Data

Jul. 24, 1998 (DE) .......................... 198 33 403

(51) Int. Cl.⁷ ................................. F16D 1/00
(52) U.S. Cl. .................. 403/348; 296/96.17; 15/250.29
(58) Field of Search ........................ 403/348; 296/96.17, 296/96.15; 15/250.49, 250.29

(56) References Cited

U.S. PATENT DOCUMENTS 4,307,482 A * 12/1981 Palmer ..................... 15/250 B
5,203,602 A * 4/1993 Eustache ................. 296/96.15
5,504,966 A * 4/1996 Lee et al. ................. 15/250.19
5,956,800 A * 9/1999 Morin et al. ............. 15/250.31
6,027,157 A * 2/2000 Epple ....................... 296/96.15
6,145,157 A * 11/2000 Ostrowski ................ 15/250.31
6,168,223 B1 * 1/2001 Egner-Walter ........... 296/96.17

FOREIGN PATENT DOCUMENTS

| DE | 40 36 367 | 5/1992 |
| DE | 43 23 551 | 1/1994 |
| FR | 1368673 | 12/1964 |
| GB | 2 228 188 | 8/1990 |

* cited by examiner

Primary Examiner—Lynne H. Browne
Assistant Examiner—John B. Walsh
(74) Attorney, Agent, or Firm—J. Gordon Lewis

(57) ABSTRACT

An attachment device 10 for a windshield wiper arrangement for motor vehicles is described which makes possible a non-screw type mounting and thus a mounting which is to be carried out in a simple and rapid manner. For this purpose, the attachment device 10 has a support element 14 carrying a windshield wiper drive device 12 at which two lateral plug-in pegs 30, 32 are provided which are parallel to each other and protrude in the same direction diagonally with respect to wiper shafts 20, 22 mounted on same. These plug-in pegs, together with a third plug-in peg 34, are located respectively on corner points of a triangle, wherein the third plug-in peg 34 extends in a vertical plane perpendicular to the two other plug-in pegs 30, 32.

18 Claims, 2 Drawing Sheets

FASTENING DEVICE FOR A WINDSCREEN WIPER SYSTEM

BACKGROUND OF THE INVENTION

The invention relates to an attachment device for a windshield wiper system for motor vehicles.

An attachment device of this type is known from DE 4036367 A1. It has an elongated support element accommodating a windshield wiper drive device, having in the area of its two ends, respectively, an attachment member with the aid of which the support element can be attached at one part of the vehicle body.

These attachment members are formed by means of screws extending in parallel to each other and, while axially secured, can be turned and extended in the same direction and can be screwed into threaded bore holes on the vehicle body side.

This type of attachment required a correspondingly expensive, special bearing and mounting of the screws at the end pieces of the support element as well as a screwing-on of the attachment device at the vehicle, which is time-consuming and at the same time cost-intensive.

The invention is based on the problem of simplifying an attachment device which in its structural conception corresponds to that of the attachment device with respect to the manufacturing technology as well as to the mounting technology.

SUMMARY OF THE INVENTION

In accordance with the invention, this problem is solved.

This attachment device is to be mounted rapidly and simply below a windshield by means of a non-screw type plug-in connection at a support wall or a similar receiving part of a vehicle body in a single move, wherein a plug-in peg extending diagonally to the plug-in pegs arranged at the support element axially secures the two support element-attached plug-in pegs against release of same from the openings into which they are inserted.

The plug-in pegs can be rigidly mounted at their carriers in a simple manner by welding or by a press fit connection. In order for the pegs to be received on the vehicle body side, cylindrical bores suffice, wherein merely two of them are to have a tight fit to ensure a shake-proof mounting of the attachment device.

In this connection, it should be pointed out that from DE 4413635 A1 an attachment device is known which, via three attachment points located at the corners of a triangle, is supported at vehicle body parts.

Two of the attachment points are arranged laterally at the windshield wiper system and are to be tightly connected with a vehicle body wall with appropriate attachment parts. In accordance with a preferred embodiment, the third attachment point is defined by a holding element which can be built on and whose construction is expensive and which carries a rubber socket into which a mounting part, protruding from the wiper arrangement, can be inserted.

Also, with this construction, the attachment device thus cannot be mounted by a non-screw type plug-in connection.

With respect to the construction of the invention, an advantageous support basis on the vehicle body side of the attachment device is to be achieved.

This results in an advantageous arrangement of the third plug-in peg, whereby a relatively great lateral distance of same from the support element as well as an advantageous peg insertion into the insertion bore assigned to it can be achieved.

An offset of the insertion openings which depends on the manufacturing technology or possibly also a redundancy in the position of the attachment points may not have disadvantageous consequences.

Finally, it is advantageous, for the purpose of a decoupling of plug-in components in accordance with the oscillations, wherein the components are to be mutually engaged, to provide the insertion openings with a damping element.

BRIEF DESCRIPTION OF THE DRAWINGS

Additional advantages, characteristics and details of the invention result from the subclaims and the subsequent description in which a preferred example of the invention is described in detail with the aid of the illustration, wherein:

DESCRIPTION OF THE PREFERRED EMBODIMENTS

Figures 1, 1A:
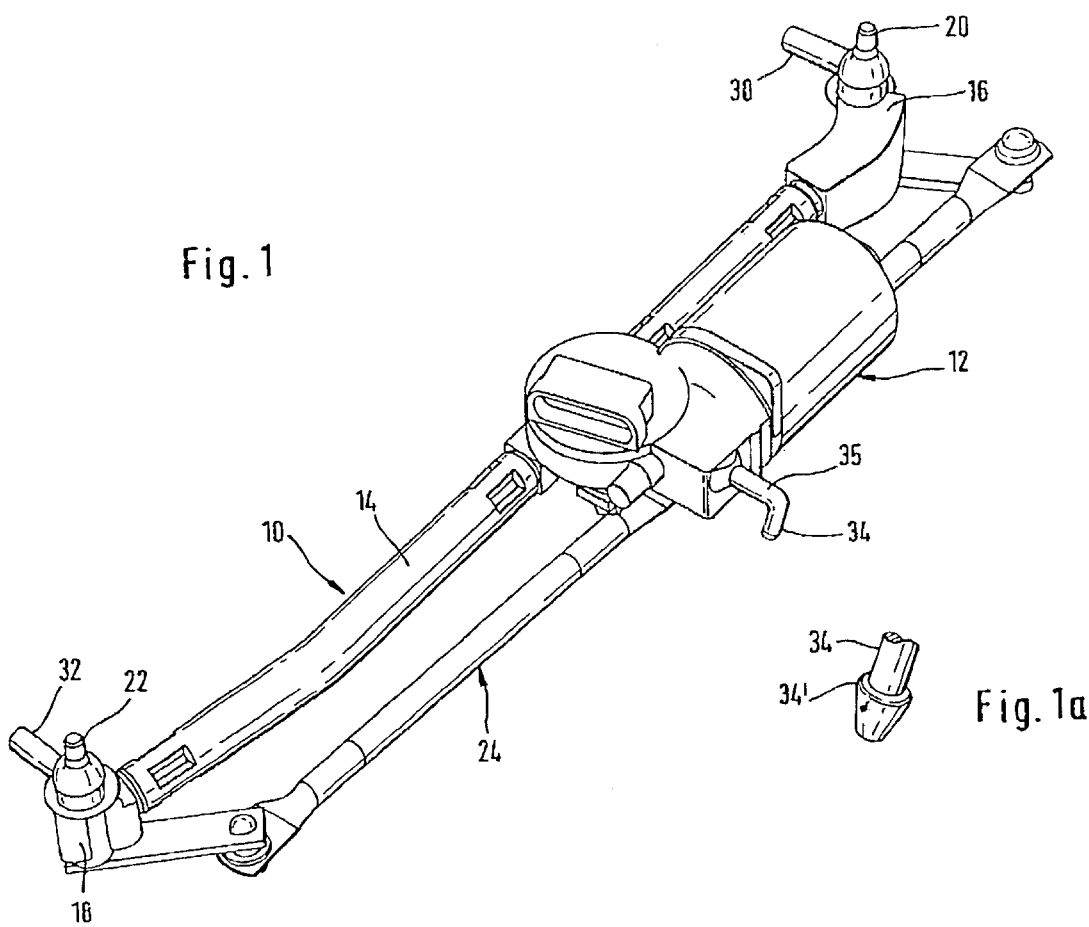
FIG. 1 shows a graphic representation of an attachment device of a windshield wiper arrangement onto which its windshield wiper drive device is premounted.
FIG. 1a shows a structural component of the attachment device.

In FIG. 1, reference number 10 is a part of an attachment device of a windshield wiper arrangement onto which a windshield wiper drive device 12 has been premounted. The same is intended, for example, to be driven in the same direction as two windshield wipers.

A rod-like support element 14 of the attachment device 10 carries a bearing element 16 or 18 at both ends, respectively, in which, respectively, a wiper shaft 20 or 22 is supported for accommodating a windshield wiper in a turnable mode while being axially secured.

On the support element 14, approximately on its central piece, the windshield wiper drive device 12 is located by means of which coupling links 24 for the synchronization of the rotational movements of the wiper shafts 20, 22 can be operated.

The structural unit, formed from the two pre-mounted structural components 10, 12 can be attached by means of a non-screw type plug-in connection below a windshield 26 of a vehicle body at a support wall 28 or at appropriate vehicle body parts. For this purpose, each bearing element 16, 18 carries a cylindrical plug-in peg 30 or 32, protruding parallel to each other and in the same direction perpendicular to the wiper shafts 20, 22 from the bearing elements 16, 18 in forward direction. An additional cylindrical plug-in peg 24 is rigidly attached on the side on the windshield wiper drive device 12 which faces away from the support element 14. This plug-in peg lies in a vertical plane and extends perpendicular to the two plug-in pegs 30, 32 in accordance with FIG. 1, preferably in a downward direction. The plug-in pegs 30, 32, 34, thus are located on the corner points of a triangle and form a solid support basis.

Figure 2:
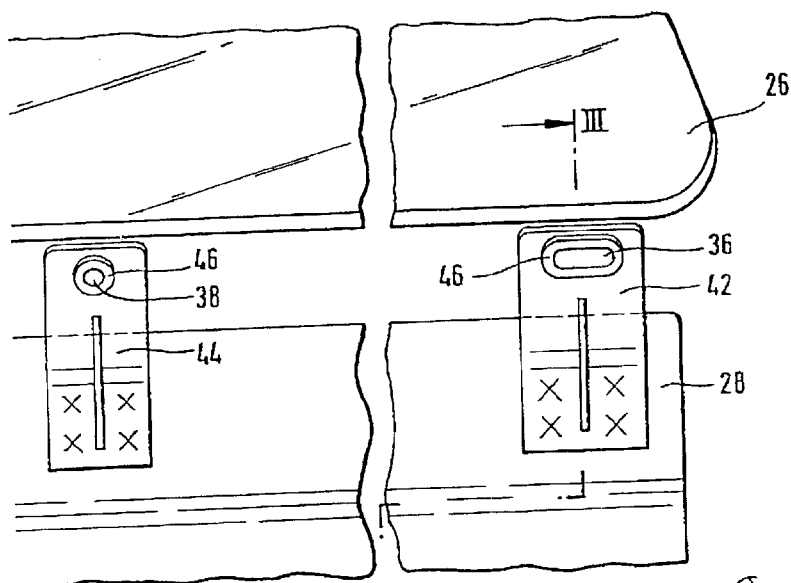
FIG. 2 shows a truncated view of two of the three attachment points on the vehicle body side for the plug-in mounting of the attachment device, as viewed in the direction of the arrow A of FIG. 3.
Figure 3:
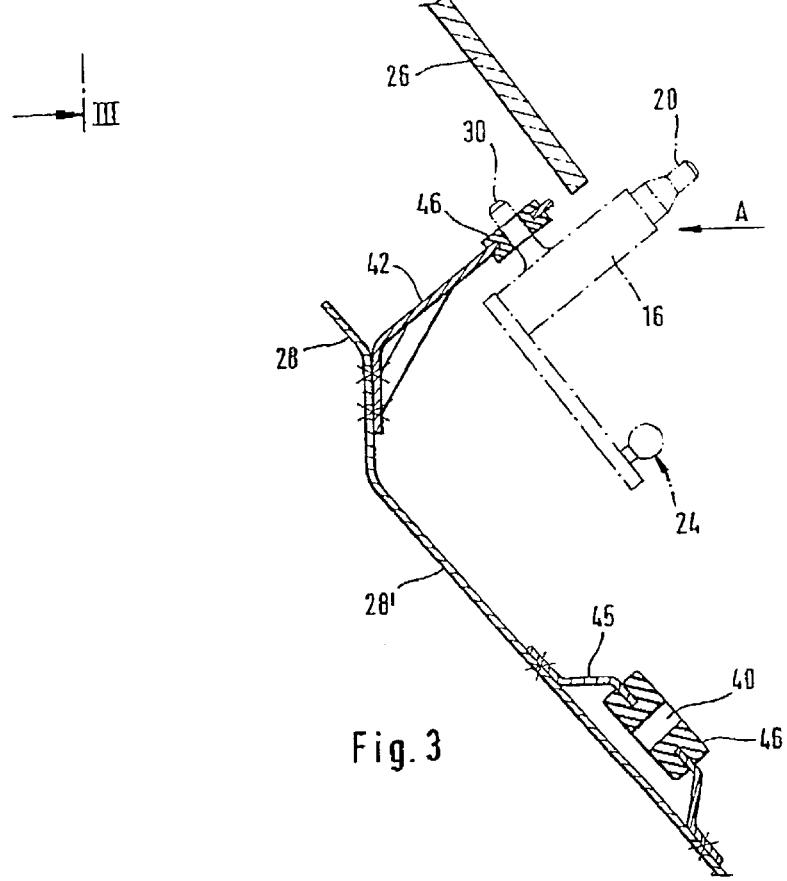
FIG. 3 shows a cross-section extending along the line III—III of FIG. 2 through an attachment point on the vehicle body side, wherein the plug-in connection of a plug-in peg of the attachment device, held at this attachment point, is shown in dot-dash lines.

With insertion openings 36, 38 and 40 assigned in a vehicle body-rigid manner to the plug-in pegs 30, 32, 34 as depicted in FIGS. 2 and 3. Hereof, for example, the insertion openings 36, 38 are each provided in a receiving bracket 42 or 44, respectively plotted at a lateral distance from each other onto the support wall 28, while the insertion opening 40, as FIG. 3 shows, below and approximately in the center between the receiving brackets 42, 44 of the support wall 28 at a wall part 28', for example, approximately parallel to the windshield 26 and, as viewed in the driving direction of the vehicle, inclined diagonally forward below, is provided in a holder 45.

In order to equalize production-dependent tolerances during the positioning of the upper insertion openings 36, 38, one of same, for example, the one on the right, is in the form of an elongated hole 36.

For decoupling, in accordance with the oscillations of the pre-mounted structural unit 10, 12, 24, from the support wall 28, the insertion openings 36, 38, 40 are provided in sockets 46 made of rubber or another suitable elastic material which, in turn, are tied into corresponding openings of the parts 42, 44, 45.

As FIG. 1 shows, the plug-in peg 34 is, for example, formed by the free end piece of a cylinder pin 35 bent off at a right angle. Also, any other formation and arrangement is conceivable; in particular, the plug-in peg 34 could also be directed upwardly.

Both possible arrangements of the plug-in peg 34 ensure that with the structural unit 10, 12, 24, as soon as its plug-in pegs 30, 32, 34 are engaged with the assigned insertion openings 36, 38, 40, the plug-in peg 34 forms a stop by means of which an axial displacement and thereby a release of the two other plug-in pegs 30, 32 from their insertion openings 36, 38 is prevented.

As FIG. 1a shows, the plug-in peg 34 may have a thickened area at the free peg end at 34' and may preferably have a conical form in order to secure same in the socket 46, by locking.

What is claimed is:

1. An attachment device for a windshield wiper arrangement for motor vehicles comprising:
    a support element carrying a windshield wiper drive device having first and second lateral, elongated attachment members protruding from the support element in the same direction diagonal to wiper shafts mounted in the support element, the first and second attachment members engageable with at least one receiving opening on a vehicle body; and
    at least an additional third attachment member at a distance from a connecting line of the first and second attachment members, wherein the at least one third attachment member extends at an angle to a plane fixed by the first and second attachment members and wherein all first, second and third attachment members form plug-in elements for a non-screw type plug-in connection of the support element with the vehicle body.

2. The attachment device of claim 1 further comprising each of the first, second and third attachment members located on corner points of a triangle.

3. The attachment device of claim 1 further comprising the third attachment member perpendicular to the first and second attachment members located on the support element.

4. The attachment device of claim 1 further comprising the first and second attachment members extending parallel to each other.

5. The attachment device of claim 1 further comprising the at least one third attachment member located approximately midway between the first and second attachment members on the support element.

6. The attachment device of claim 1 further comprising the at least one third attachment member located adjacent the windshield wiper drive device carried by the support element.

7. The attachment device of claim 1 further comprising the at least one third attachment member, locatable in a perpendicular plane with respect to a windshield to be wiped, extending in an opposite direction from the windshield to be wiped.

8. The attachment device of claim 1 comprising one of two insertion openings on the vehicle body assigned to the first and second attachment members located laterally spaced along the support element with respect to one another, the one of two insertion openings forming an elongated aperture having a greater width in a direction toward the other adjacent one of two insertion openings.

9. The attachment device of claim 8 further comprising the insertion openings located in a rubber socket inside the vehicle body.

10. In an attachment device for a windshield wiper arrangement for motor vehicles with a support element carrying a windshield wiper drive device having two lateral, elongated attachment members protruding parallel to one another from the support element in an identical direction diagonal to the wiper shafts mounted in the support member and engageable within at least one corresponding receiving opening on a vehicle body, the improvement comprising:
    at least one additional attachment member spaced at a distance from an imaginary line connecting the two attachment members, wherein the at least one additional attachment member extends at an angle to a plane fixed by the two first attachment members, and wherein all of the attachment members form plug-in pegs for a non-screw type plug-in connection of the support element with the vehicle body.

11. The improvement of claim 10 further comprising:
    all of the attachment members located on the corner points of a triangle.

12. The improvement of claim 10 further comprising:
    the at least one additional attachment member including a third attachment member extending perpendicular to the first and second attachment members connected to the support element.

13. The improvement of claim 10 further comprising:
    the first and second attachment members positioned extending parallel with respect to each other.

14. The improvement of claim 10 further comprising:
    the at least one additional attachment member including a third plug-in attachment member positioned approximately midway between the first and second attachment members positioned on the support element.

15. The improvement of claim 10 further comprising:
    the at least one additional attachment member including a third attachment member positioned adjacent a windshield wiper drive device carried by the support element.

16. The improvement of claim 10 further comprising:
    the at least one additional attachment member including a third attachment member locatable in a perpendicular plane with respect to a windshield to be wiped, and extending in an opposite direction from the windshield to be wiped.

17. The improvement of claim 10 further comprising:
    one of two insertion openings on the vehicle body assigned to the one of the first and second attachment members spaced laterally from one another on the support element, the one insertion opening defined by an elongated aperture having a greater width in a direction toward the other adjacent one of two insertion openings.

18. The improvement of claim 10 further comprising:
a plurality of insertion openings provided in a rubber socket inside a vehicle body.

* * * * *